Feb. 2, 1943.  E. W. HALL  2,309,951
ROTARY ABRADING TOOL
Filed Jan. 7, 1941  2 Sheets-Sheet 1
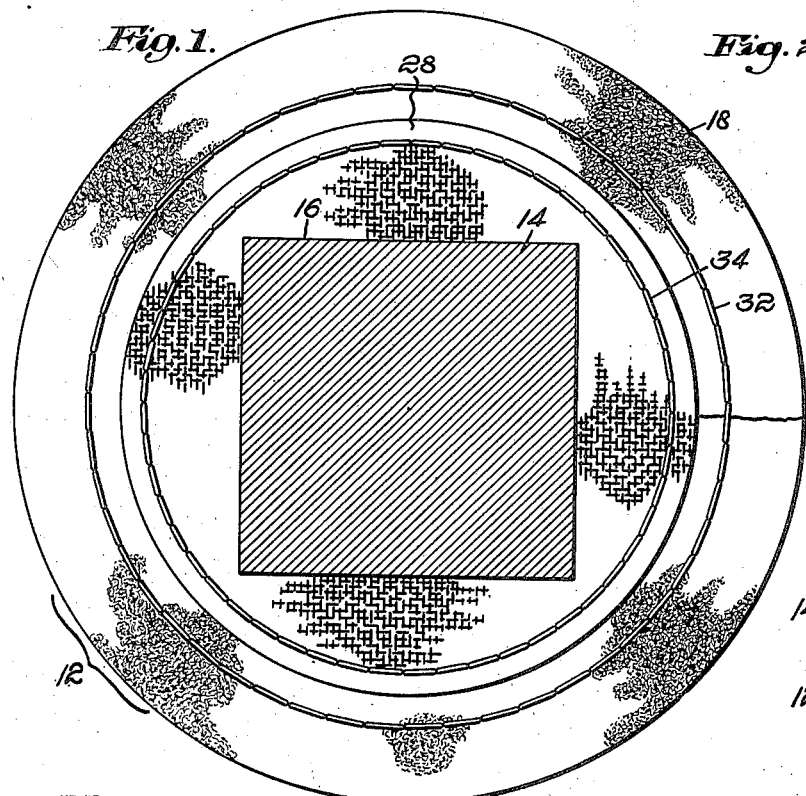
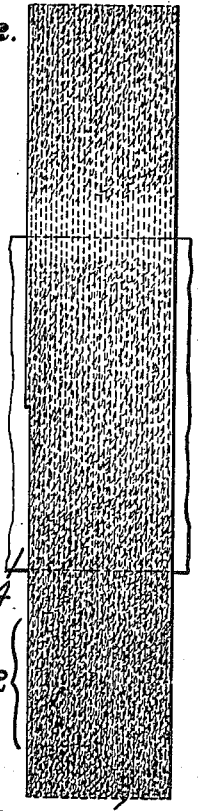
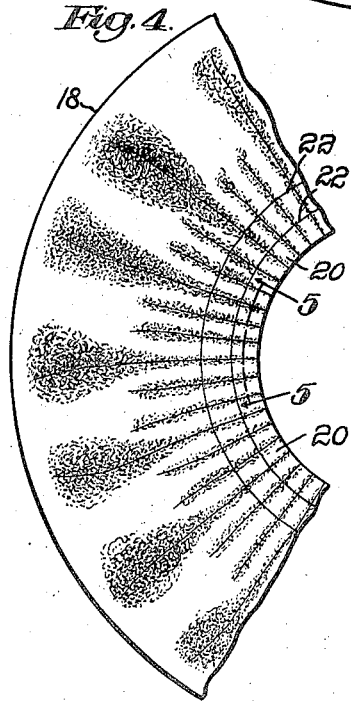
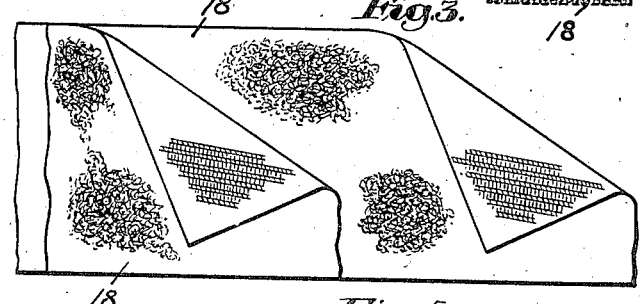
Inventor:
Elisha W. Hall.

Feb. 2, 1943.    E. W. HALL    2,309,951
ROTARY ABRADING TOOL
Filed Jan. 7, 1941    2 Sheets-Sheet 2
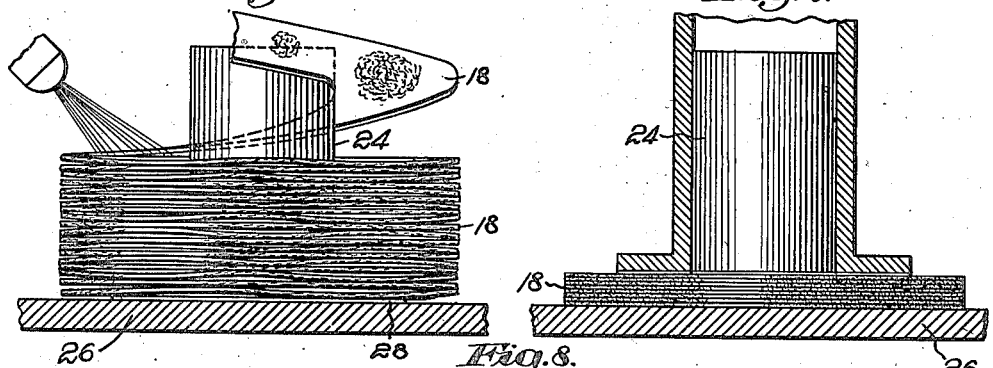
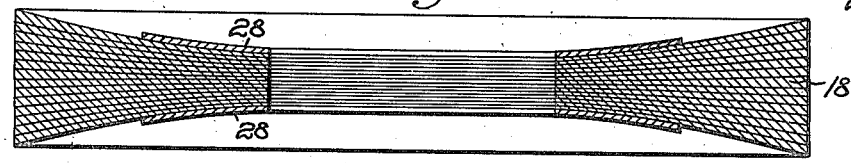
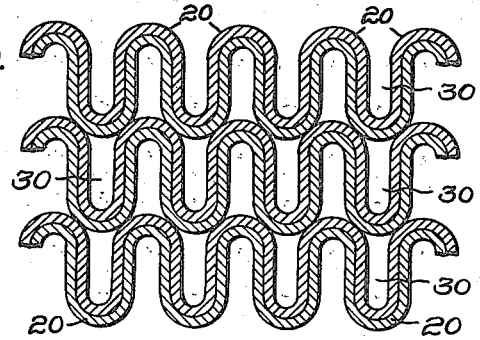
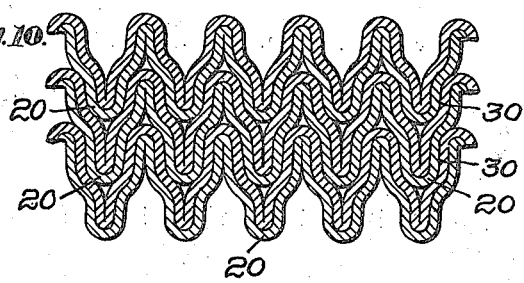
Inventor:
Elisha W. Hall,
by Emery, Booth, Townsend, Miller & Weidner
Attys.

Patented Feb. 2, 1943

2,309,951

UNITED STATES PATENT OFFICE 2,309,951

ROTARY ABRADING TOOL

Elisha W. Hall, Scituate, Mass.

Application January 7, 1941, Serial No. 373,443

3 Claims. (Cl. 51—193)

This invention relates to flexible, rotary cylinder abrading tools and is concerned with a tool whose characteristics are such that it is especially desirable for modern tin-mill wiping operations. Tin-mills are now using soft rolls, that is to say the cylindrical abrading surfaces are softer than heretofore. However, if the nature of the abrading sections is such that enormous endwise pressure is required to keep them from becoming deformed and turning on the arbor even in the case of a square arbor, there is danger of this pressure causing undesired hardness at the periphery.

In meeting these new conditions, I have produced a novel tool in which the sections are hubless, that is to say, they have no false centers, and the abrading material, accordingly, contacts and interlocks directly with the spindle against relative rotation as by providing the sections with square openings to fit a square arbor. However, this at once introduces the problem of providing a section which shall be sufficiently hard and compact as well as thin in an axial direction close to the arbor, and also water-resistant, so that there is no danger of its square opening becoming deformed so as to turn on the arbor. These problems are solved in the present invention by employing a series of coaxial layers or laminae of flexible, yielding material helically wound, for example, each layer (or convolution when helically coiled) being interlocked with a contiguous layer as by providing each layer with a set of spaced projections, ruffles for example, the projections of each layer being received in the spaces between the projections of the next layer. The contiguous layers are further adhesively secured together by adhesive, latex, for example, being well-suited to the purpose and being applied in rather generous quantity so that the fabric is quite well impregnated and water-resistant. This material is also well suited to the purpose because it remains non-tacky for a considerable time and allows the projections on one layer to be forced into the spaces between the projections of a contiguous layer when sufficient pressure, far in excess of past practice, is employed.

The invention will best be understood by reference to the following description when taken in connection with the accompanying drawings illustrative of one embodiment thereof, while its scope will be pointed out more particularly in the appended claims.

In the drawings:

Fig. 1 is an end elevation of an abrading tool embodying the invention;

Fig. 2 is a side elevation of the same;

Fig. 3 is an elevation of two superposed, bias-cut strips of fabric;

Fig. 4 is an elevation of the two strips of fabric ruffled;

Fig. 5 is a sectional view on an enlarged scale on line 5—5 of Fig. 4;

Fig. 6 is an elevation illustrating the helical coiling of the ruffled strips and the application of latex thereto;

Fig. 7 is an elevation illustrating the compression of the helical coil;

Fig. 8 is a sectional view illustrating the compressed assembly;

Fig. 9 is a sectional view illustrating, on an enlarged scale, the relative arrangement of the ruffles prior to compression; and Fig. 10 is a sectional view, also on an enlarged scale, illustrating the nested or interjacent ruffles after compression.

Referring to the drawings and to the embodiment of the invention illustrated therein by way of example, there is shown an abrading tool (see Figs. 1 and 2) comprising a flexible, rotary square cylinder 12, which, as will presently appear, is composed of a series of coaxial layers of flexible, yielding, abrading material with no false center or hub whatever, so that abrading material itself contacts and interlocks with an arbor 14 against relative rotation. One convenient interlocking arrangement is an arbor having a polygonal cross-section, square for example, fitting an opening 16 of like shape in the body of abrasive material. Where, as in a tin-mill wiper, an arbor of great length is employed, many of these sections are placed end to end on the arbor.

The desired compactness, strength, and water-resisting properties of the sections immediately about the arbor are achieved by a novel construction now to be described. In the first place, it is desirable that the section be non-fray, and this is rendered conveniently possible by employing bias-cut strips 18 (see Fig. 3) of woven cotton cloth such as cotton flannel, for example, two such strips superposed being shown, constituting a laminated strip. One fabric which is especially well-suited to the purpose is a cotton twill which is teazeled on one side only. This gives the material the requisite degree of softness at the periphery without impairing its strength and firmness elsewhere. Where, as in the present case, two such strips are superposed, it is highly desirable that their unteazeled surfaces be placed face to face (see Fig. 3). This is desirable for two reasons, first, the tendency of each strip to curl, because of teazeling, is counteracted by the like tendency of the other, and second, the teazeled surface at the outside takes the latex adhesive better than an unteazeled surface. The non-curling characteristic is important because, when subsequently the sections are being assembled on a spindle, if an edge of the fabric were to curl over and remain unnoticed, it would produce an interruption in the periphery.

Whether the strip is to be made into individual disks, with one turn of the strip to each disk, or with many helical turns or convolutions as in the present example, it is desirable to shorten the strip along one edge to give it a curvature (see Fig. 4) approximating that which it is to have in the completed section. One way to do this is illustrated in Figs. 4 and 5 and consists in producing along one edge of the laminated strip a succession of ruffles 20 as by passing the strip through a sewing machine equipped with a ruffling attachment and maintaining the ruffles by one or more, herein two rows of stitches 22. However, the thread tension is not too great to prevent considerable flexibility and consequent ability of the ruffles to spread apart. The importance of this will presently appear.

When, as in the present example, a section is to be made up by winding the strip helically (see Fig. 6), the winding takes place on and about a temporary cylindrical core 24 upstanding from a rotatable support 26. In the present example, the section is provided with disks 28 of canvas, for example (see Fig. 8), one of which is placed on the support 26 and given a coat of flexible adhesive such as latex, after which the helical winding of the strip 18 takes place and latex is applied liberally to the strip in a narrow path near the core and along the ruffles in sufficient amount not only to serve to unite the convolutions but also to impregnate them to a sufficient extent to render the impregnated portion water-resistant.

After a sufficient number of turns have been built up in this fashion, the strip is severed, and the second canvas disk 28 is placed at the top upon the latex coating. Owing to the great thickness of the ruffles 20 in an axial direction (see Fig. 9) and owing to the absence of pressure, the ruffles, although separated by slight spaces 30, will build up to a great aggregate thickness in an axial direction. The outer edge of the strip is, however, loosely spaced. It will be remembered that in the tin-mill the sections, when placed end to end on the arbor, should be firm at the periphery, while those portions immediately about the arbor should be so thin that, when clamped in the usual fashion, they will not prevent the desired firmness near the periphery.

This ideal condition of one of the sections is represented in Fig. 8, in which it will be observed that the part which previously had the greatest axial dimension, now actually has the least axial dimension. This extraordinary result is achieved (see Fig. 7) by exerting in an axial direction on the assembly an enormous pressure,—forty thousand pounds, which (compare Figs. 9 and 10) causes the projections 20 to enter into the spaces 30. Possibly another factor in this result is the fact that freshly applied latex is non-tacky and perhaps when used in sufficient quantity lubricates the fabric and facilitates the spreading of the spaces 30 and the entrance of the projections thereinto. However that may be, close inspection of the finished product shows that the portion immediately about the central openings (see Fig. 8) actually is the most compact part of the structure. It therefore satisfies the requirement that it shall not present an obstacle to the desired firm and compact periphery. Furthermore, the nature of the central portion satisfies the requirement of firmness about the arbor, so that there shall be no danger of the central portion becoming distorted and turning on the arbor. Moreover, the compactness plus the impregnation of the fabric makes the central portion water-resistant. And finally, these desirable results are achieved by a section having no separate hub. This, in itself, is a great advantage because of the danger, always present, of a hub turning within the buffing material.

In the example shown (see Fig. 1) two concentric rows of stitches 32 and 34, one row extending through the entire assembly including the canvas disks 28 and the other extending through the strips 18 only, further unite the parts and impart additional strength.

Having thus described one embodiment of the invention, what I claim and desire by Letters Patent to secure is:

1. A flexible, rotary cylinder abrading tool comprising a helically-wound, composite strip composed of two layers of cloth, each teazeled on one side only, the non-teazeled sides being disposed face to face.

2. A flexible, rotary cylinder abrading tool comprising a helically-wound, composite strip composed of two layers of cloth, each teazeled on one side only, the non-teazeled sides being disposed face to face, and the teazeled faces of successive convolutions being secured together by adhesive.

3. A flexible, rotary cylinder abrading tool comprising a helically-wound, composite strip composed of two layers of bias-cut, twilled cloth, each teazeled on one side only, the non-teazeled sides being disposed face to face, and the teazeled faces of successive convolutions being secured together by adhesive.

ELISHA W. HALL.